(12) United States Patent
Yi et al.

(10) Patent No.: US 12,452,815 B2
(45) Date of Patent: Oct. 21, 2025

(54) SENDING TIME DETERMINATION METHOD AND DEVICE, AND INDOOR GONIOMETRIC METHOD AND DEVICE

(71) Applicant: BEIJING XIAOMI MOBILE SOFTWARE CO., LTD., Beijing (CN)

(72) Inventors: Xinlin Yi, Beijing (CN); Yong Zhang, Beijing (CN); Ningzhi Zhu, Beijing (CN); Runyu Shi, Beijing (CN); Kai Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 417 days.

(21) Appl. No.: 18/071,609

(22) Filed: Nov. 29, 2022

(65) Prior Publication Data
US 2024/0049156 A1 Feb. 8, 2024

(30) Foreign Application Priority Data
Aug. 8, 2022 (CN) .......................... 202210945273.8

(51) Int. Cl.
*H04W 56/00* (2009.01)
*G01S 3/802* (2006.01)

(52) U.S. Cl.
CPC ......... *H04W 56/0065* (2013.01); *G01S 3/802* (2013.01)

(58) Field of Classification Search
CPC ........... G06Q 90/20; G01S 19/48; G01S 5/20; G01S 3/802; G01S 3/80; G01S 5/18;
(Continued)

(56) References Cited

U.S. PATENT DOCUMENTS 8,188,923 B2 * 5/2012 Ferreol ..................... G01S 5/12
342/464
8,548,490 B2 * 10/2013 Wang ................... H04W 52/322
455/456.2
(Continued)

FOREIGN PATENT DOCUMENTS

CN 109565772 A 4/2019
CN 110749889 A 2/2020
(Continued)

OTHER PUBLICATIONS

Extended European Search Report for EP Application No. 22214616.9 dated Aug. 18, 2023, (10p).
(Continued)

*Primary Examiner* — Jung Liu
(74) *Attorney, Agent, or Firm* — Arch & Lake LLP; Hao Tan; Shen Wang

(57) ABSTRACT

A sending time determination method includes: determining a transmission duration and a synchronization error of signal transmission between the device to be measured and a goniometric device; determining a receiving time slot for the goniometric device to receive ultrasonic goniometric signal sent by the device to be measured, where the goniometric device is configured to receive ultrasonic goniometric signals sent by a plurality of devices to be measured, and the goniometer device receives the ultrasonic goniometric signals sent by different devices to be measured in different receiving time slots; and determining a sending time of the ultrasonic goniometric signal according to the receiving time slot, the transmission duration and the synchronization error.

17 Claims, 8 Drawing Sheets

(58) Field of Classification Search
CPC ..... G01S 2201/02; H04W 4/33; H04W 4/029; H04W 4/021; H04W 56/0065
See application file for complete search history.

(56) References Cited

U.S. PATENT DOCUMENTS

| | | | | |
|---|---|---|---|---|
| 8,909,251 | B2* | 12/2014 | Agarwal | G06Q 90/20 |
| | | | | 455/456.1 |
| 10,310,069 | B2* | 6/2019 | Younis | G01S 13/867 |
| 11,033,238 | B2* | 6/2021 | Fu | G16H 20/30 |
| 2005/0037817 | A1 | 2/2005 | Ono | |
| 2011/0140966 | A1* | 6/2011 | Ferreol | G01S 5/12 |
| | | | | 342/387 |
| 2013/0344893 | A1* | 12/2013 | Agarwal | G06Q 90/20 |
| | | | | 455/456.1 |
| 2017/0131398 | A1* | 5/2017 | Younis | G01S 13/758 |
| 2021/0373142 | A1 | 12/2021 | Lim | |
| 2025/0039826 | A1* | 1/2025 | Reddy | H04W 64/006 |
| 2025/0039828 | A1* | 1/2025 | Manolakos | H04W 64/00 |
| 2025/0048157 | A1* | 2/2025 | Manolakos | H04W 72/0457 |
| 2025/0052853 | A1* | 2/2025 | Xu | H04W 72/044 |
| 2025/0056514 | A1* | 2/2025 | Manolakos | H04L 5/0048 |
| 2025/0056627 | A1* | 2/2025 | Reddy | G01S 5/00 |
| 2025/0067835 | A1* | 2/2025 | Thomas | G01S 11/04 |

FOREIGN PATENT DOCUMENTS

| | | |
|---|---|---|
| CN | 110971326 A | 4/2020 |
| CN | 111885694 A | 11/2020 |
| CN | 113260053 A | 8/2021 |
| GB | 2570101 A | 7/2019 |
| WO | 2022080992 A1 | 4/2022 |

OTHER PUBLICATIONS

"1/2/3/4/5G multiple access technology (FDMA, TDMA, CDMA, OFDMA, new multiple access technology)", Nov. 12, 2022, URL:https://zhuanlan.zhihu.com/p/339086147.(4p).

First Office Action issued to Chinese Application No. 202210945273.3 dated Mar. 21, 2025 with English translation (15p).

\* cited by examiner

SENDING TIME DETERMINATION METHOD AND DEVICE, AND INDOOR GONIOMETRIC METHOD AND DEVICE

CROSS REFERENCE TO RELATED APPLICATION

This application is based upon and claims priority to Chinese Patent Application No. 202210945273.8, filed on Aug. 8, 2022 the entire content thereof is incorporated herein by reference for all purposes.

BACKGROUND

With the development of smart phones and smart home, accurate goniometric measurement for indoor smart devices has more and more extensive application scenarios. Ultrasonic goniometric technology is currently one of the more mature solutions to achieve high-precision goniometric measurement.

SUMMARY

This disclosure relates to the field of positioning technology, and in particular, to a sending time determination method, a sending time determination device, an indoor goniometric method, an indoor goniometric device, a terminal, and a computer-readable storage medium.

In view of above, embodiments of this disclosure provide a sending time determination method, a sending time determination device, an indoor goniometric method, an indoor goniometric device, a terminal, and a computer-readable storage medium.

According to a first aspect of this disclosure, a sending time determination method is proposed, which is applied to a device to be measured and included: determining a transmission duration and a synchronization error of signal transmission between the device to be measured and a goniometric device; determining a receiving time slot for the goniometric device to receive ultrasonic goniometric signal sent by the device to be measured, where the goniometric device is configured to receive ultrasonic goniometric signals sent by a plurality of devices to be measured, and the goniometer device receives the ultrasonic goniometric signals sent by different devices to be measured in different receiving time slots; and determining a sending time of the ultrasonic goniometric signal according to the receiving time slot, the transmission duration and the synchronization error.

According to a second aspect of this disclosure, an indoor goniometric method is proposed, which is applied to a goniometric device and includes: exchanging synchronization signal with a device to be measured, causing the device to be measured to determine a transmission duration and a synchronization error of signal transmission between the device to be measured and the goniometric device; indicating to the device to be measured a receiving time slot of ultrasonic goniometric signal, where the transmission duration, the synchronization error and the receiving time slot are used for the device to be measured to determine a sending time of the ultrasonic goniometric signal, and receiving time slots indicated for different devices to be measured are different; and receiving the ultrasonic goniometric signal sent by the device to be measured in the receiving time slot, thereby performing indoor goniometric measurement for the device to be measured.

According to a third aspect of this disclosure, a terminal is provided and includes: a processor; and a memory for storing executable instructions of the processor; where the processor is configured to implement the method according to the first aspect as described above by running the executable instructions.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Figure 1A:
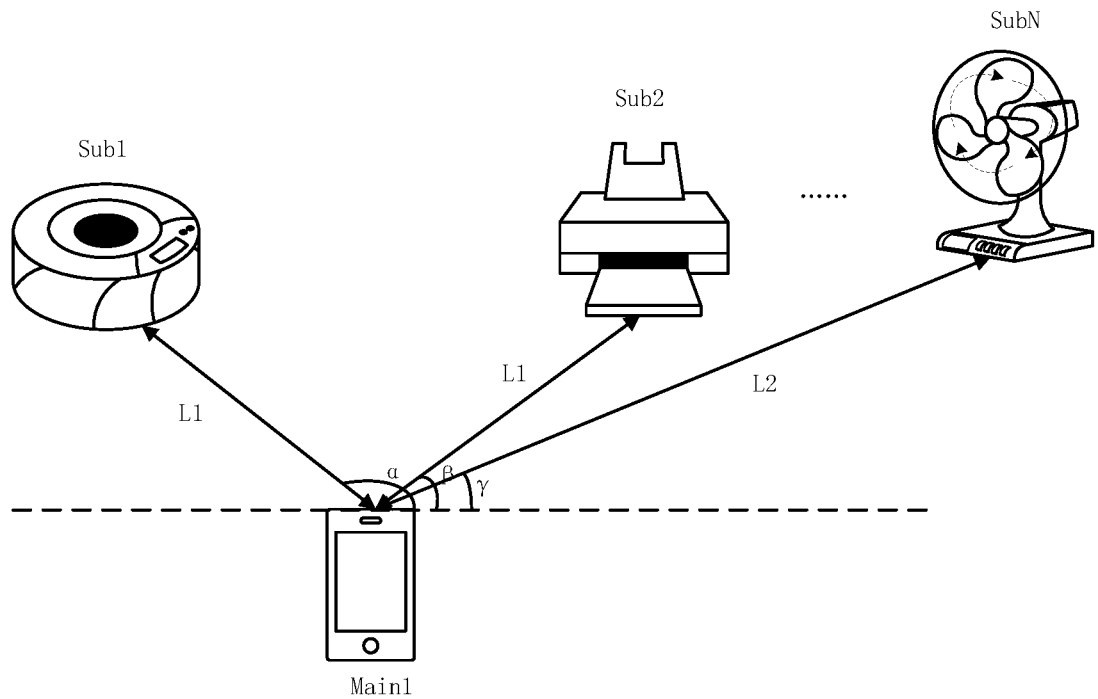
FIG. 1a is a schematic diagram of an indoor goniometric scenario according to one or more examples of this disclosure.

Exemplary embodiments will be described in detail herein, examples of which are illustrated in the accompanying drawings. Where the following description refers to the drawings, the same numerals in different drawings refer to the same or similar elements unless otherwise indicated. The implementations described in the illustrative examples below are not intended to represent all implementations consistent with this disclosure. Rather, they are merely examples of apparatus and methods consistent with some aspects of this disclosure as recited in the appended claims.

The terminology used in this disclosure is for the purpose of describing particular embodiments only and is not intended to limit the disclosure. As used in this disclosure and the appended claims, the singular forms "a", "the" and "said" are intended to include the plural forms as well, unless the context clearly dictates otherwise. It will also be understood that the term "and/or" as used herein refers to and includes any and all possible combinations of one or more of the associated items as listed.

It should be understood that although the terms first, second, third and the like may be used in this disclosure to describe various information, such information should not be limited by these terms. These terms are only used to distinguish the same type of information from each other. For example, the first information may also be referred to as the second information, and similarly, the second information may also be referred to as the first information without departing from the scope of this disclosure. Depending on the context, the word "if" as used herein can be interpreted as "in case of" or "when" or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Next, some embodiments of this disclosure will be described in detail.

All the embodiments of this disclosure are mainly applied to the scenario where the goniometric device performs indoor goniometric measurement on multiple devices to be measured. The goniometric device can perform indoor goniometric measurement by receiving ultrasonic goniometric signal sent by the device to be measured, and the specific goniometric algorithm includes, but is not limited to, the cross-correlation first-arrival-path estimation method.

FIG. 1a is a schematic diagram of an indoor goniometric scenario according to an exemplary embodiment of this disclosure.

As shown in FIG. 1a, Main1 is the goniometric device, and Sub1, Sub2, . . . , SubN are the devices to be measured. Main1 can receive ultrasonic goniometric signals sent by Sub1, Sub2, . . . , SubN, and perform indoor goniometric measurement on Sub1, Sub2, . . . , SubN by means of the goniometric algorithm, so as to measure the values of ∠α, ∠β and ∠γ. Based on the angles measured by the above-mentioned indoor goniometric measurement, the goniometric device is able to determine the direction of the device to be measured relative to itself, thereby facilitating the control of the device to be measured.

However, in the scenario where the goniometric device performs indoor goniometric measurements on multiple devices to be measured, the goniometric device may receive ultrasonic goniometric signals from multiple devices to be measured (e.g., in the same time slot). The ultrasonic goniometric signals sent by the devices to be measured may interfere with each other, so that the goniometric device cannot distinguish the received ultrasonic goniometric signals from each other, and thus cannot accurately perform the indoor goniometric measurements for the multiple devices to be measured.

For example, the goniometric device performs indoor goniometric measurements on n devices to be measured. Since the relationship between each device to be measured and the goniometric device may be different, such as different distances, different angles, and different obstacles on the signal propagation path, these factors may cause the transmission duration of ultrasonic goniometric signals from different devices to be measured to the goniometric device to be different.

If the sending time of the ultrasonic goniometric signal sent by the device to be measured is controlled according to only the receiving time as required, it will be difficult to accurately control the actual receiving time of the ultrasonic goniometric signal received by the goniometric device when the transmission duration is unknown.

As shown in FIG. 1a, the distance between Sub1 and Main1 is L1, the distance between Sub2 and Main1 is L1, the distance between SubN and Main1 is L2, and L2 is greater than L1.

Taking the indoor goniometric measurements of Sub1 and Sub2 performed by Main1 as an example, since the distance between Sub1 and Main1 is the same as the distance between Sub2 and Main1, without considering other factors, the transmission durations of the ultrasonic goniometric signals transmitted from Sub1 and Sub2 to Main1 are the same. If Sub1 and Sub2 send the ultrasonic goniometric signals at the same sending time, the ultrasonic goniometric signals sent by Sub1 and Sub2 will arrive at Main1 at the same time (e.g., in the same time slot).

Taking the indoor goniometric measurements of Sub2 and SubN performed by Main1 as an example, since the distance between SubN and Main1 is greater than the distance between Sub2 and Main1, without considering other factors, the transmission duration of the ultrasonic goniometric signal from SubN to Main1 is greater than the transmission duration thereof from Sub2 to Main1. If it is controlled that the sending time for Sub2 to send the ultrasonic goniometer signal is later than the sending time of SubN to send the ultrasonic signal, since the transmission duration of the ultrasonic goniometer signal from SubN to Main1 is greater than the transmission duration thereof from Sub2 to Main1, it is still possible that the ultrasonic goniometric signals sent from Sub2 and SubN may arrive at Main1 at the same time (e.g., in the same time slot).

Moreover, in addition to the different transmission durations, different devices to be measured may have different synchronization errors with the goniometric device, which may also make it difficult to accurately control the receiving time.

When it is difficult to accurately control the receiving time, it is possible to receive the ultrasonic goniometric signals sent by multiple devices to be measured in the same time slot, which makes it difficult to distinguish the ultrasonic goniometric signals sent by different devices to be measured, and thus unable to perform accurate goniometric measurement for each device to be measured.

Figure 1B:
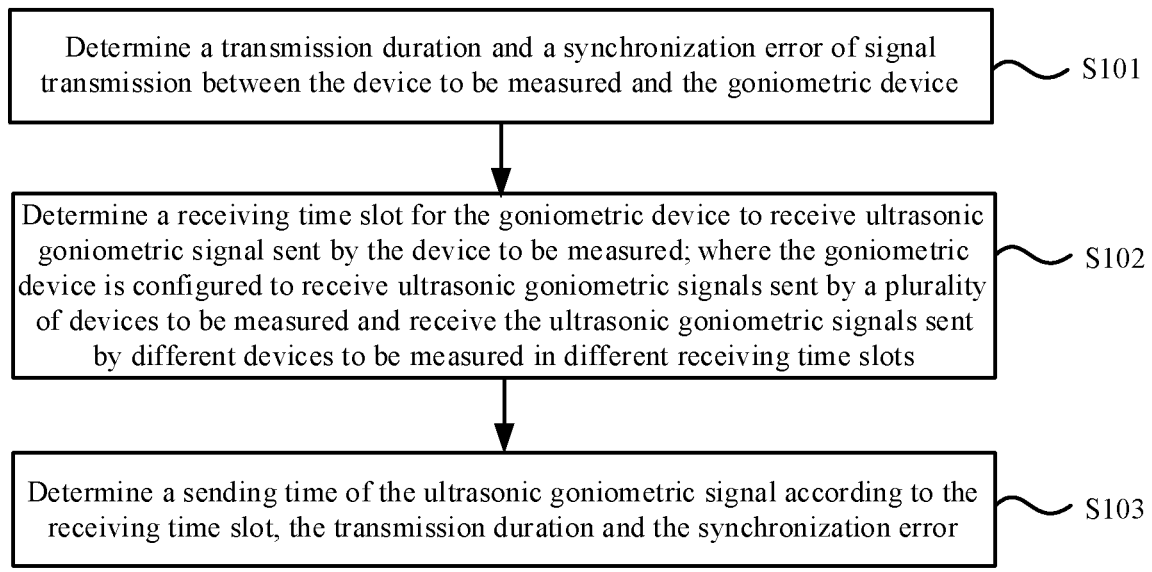
FIG. 1b is a schematic flowchart of a sending time determination method according to one or more examples of this disclosure.

FIG. 1b is a schematic flowchart of a sending time determination method according to some embodiments of this disclosure. As shown in FIG. 1b, the method may be applied to the device to be measured, which may communicate with the goniometric device. The device to be measured includes but is not limited to smart home appliance (TV, air conditioner, speaker, sweeping robot, washing machines, and the like), mobile phones, tablets, wearable devices, sensors, IoT devices and other electronic devices.

As shown in FIG. 1b, the sending time determination method may include the following steps.

In step S101, a transmission duration and a synchronization error of signal transmission between the device to be measured and the goniometric device is determined.

In step S102, a receiving time slot for the goniometric device to receive ultrasonic goniometric signal sent by the device to be measured is determined; where the goniometric device is configured to receive ultrasonic goniometric signals sent by a plurality of devices to be measured, and the goniometric device receives the ultrasonic goniometric signals sent by different devices to be measured in different receiving time slots.

In step S103, a sending time of the ultrasonic goniometric signal is determined according to the receiving time slot, the transmission duration and the synchronization error.

In some embodiments, the transmission duration and synchronization error of signal transmission between the device to be measured and the goniometric device is determined by exchanging synchronization signal with the goniometric device. For details, please refer to related content of the embodiments shown in FIG. 3 and FIG. 4, which will not be repeated here.

In some embodiments, the receiving time slot for the goniometric device to receive the ultrasonic goniometric signal sent by the device to be measured may be indicated by the goniometric device. For example, the goniometric device may configure a correspondence between the devices to be measured and the receiving time slots, and indicate to a device to be measured a receiving time slot for the goniometric device to receive the ultrasonic goniometer signal sent by the device to be measured by sending the correspondence to the device to be measured.

In some embodiments of this disclosure, the device to be measured determines the transmission duration and synchronization error of signal transmission with the goniometric device, for example, by performing signal interaction with the goniometric device. The device to be measured may also determine the receiving time slot required by the goniometric device for receiving the ultrasonic goniometric signal, for example, through indication of the goniometric device.

Furthermore, when the transmission duration and synchronization error are determined, based on the receiving time slot required by the goniometric device, the sending time of the ultrasonic goniometer signal can be accurately determined, so that the ultrasonic goniometer signal can be received by the goniometric device in the receiving time slot required by the goniometric device, thereby enabling the goniometric device to accurately control the receiving time, and to receive the ultrasonic goniometer signals sent by different devices to be measured in different receiving time slots, so as to avoid the difficulty in distinguishing ultrasonic goniometric signals sent by different devices to be measured, and achieve accurate goniometric measurement for different devices to be measured.

It should be noted that some embodiments of this disclosure may be applied to a scenario where the goniometric device performs indoor goniometric measurement on multiple devices to be measured. In other words, each device to be measured in this scenario may perform the methods respectively.

For example, the goniometric device performs goniometric measurement on n devices to be measured, the transmission duration determined by the i-th device to be measured among the n devices to be measured may be referred to as the i-th transmission duration, and the synchronization error determined by the same may be referred to as the i-th synchronization error. For the i-th device to be measured, the goniometric device may determine to receive the ultrasonic goniometric signal at the i-th time slot. Based on the i-th time slot, the i-th transmission duration, and the i-th synchronization error, the i-th device to be measured can determine the i-th sending time, and send the ultrasonic goniometric signal to the goniometric device at the i-th sending time, thereby enabling the goniometric device to receive the ultrasonic goniometric signal sent by the i-th device to be measured in the i-th time slot. Similarly, the goniometric device receives the ultrasonic goniometric signal sent by the (i+1)-th device to be measured in the (i+1)-th time slot. As seen in this way, it can be ensured that ultrasonic goniometric signals sent by different devices to be measured are received by the goniometric device in different time slots.

Therefore, according to some embodiments, it can be ensured that the goniometric device receives the ultrasonic goniometric signal sent by only one device to be measured in one time slot, so as to prevent the ultrasonic goniometric signals sent by multiple devices to be measured from reaching the goniometric device in the same time slot to cause interference with each other, thereby enabling the goniometric device to accurately receive and distinguish the ultrasonic goniometric signals of each device to be measured, and realize indoor goniometric measurement on multiple devices to be measured.

It should be noted that, when referring to "the goniometric device receives ultrasonic goniometric signals sent by different devices to be measured in different receiving time slots" in some embodiments of this disclosure, it may refer to multiple devices to be measured which send ultrasonic goniometric signals to the goniometric device in the same frequency band. The manner in which the multiple devices to be measured send the goniometric signals in such frequency band may be understood as time division multiple access (TDMA).

In some other embodiments of this disclosure, in addition to receiving the ultrasonic goniometric signals sent by different devices to be measured in different receiving time slots, the goniometric device may also receive ultrasonic goniometric signals sent by different devices to be measured in different frequency bands. Herein, the manner in which the multiple devices to be measured send the goniometric signals in different frequency bands may be understood as frequency division multiple access (FDMA).

In some embodiments, when the goniometric device needs to receive ultrasonic goniometric signals sent by N (N>1) devices to be measured, M (M>1) frequency bands may be divided for the goniometric device, and each frequency band corresponds to N/M devices to be measured. For example, if the goniometric device needs to perform indoor goniometric measurement on 8 devices to be measured (e.g., Sub1, Sub2, . . . , Sub8), and receive ultrasonic goniometric signals sent by these 8 devices to be measured, 2 different frequency bands may be determined for the goniometric device, for example, including the first frequency band (e.g., 20 khz-24 khz) and the second frequency band (e.g., 25 khz-29 khz), and the 8 devices to be measured may be divided into two groups. Then, signal interaction may be performed with 4 of the 8 devices to be measured (e.g., Sub1, Sub2, Sub3, and Sub4) through the first frequency band, and with the other 4 devices to be measured (e.g., Sub5, Sub6, Sub7, Sub8) through the second frequency band.

Figure 2:
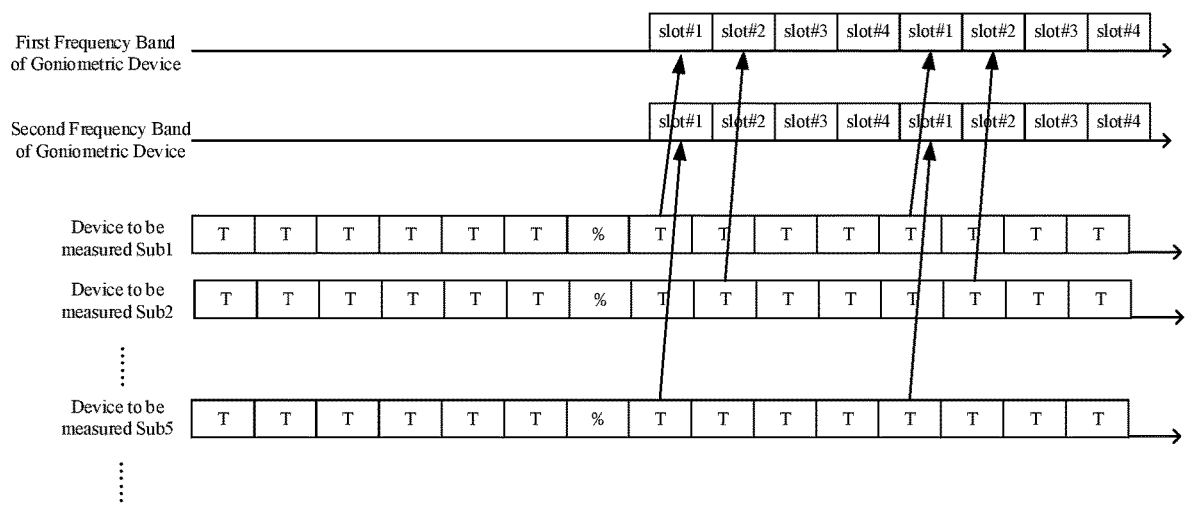
FIG. 2 is a schematic diagram illustrating transmission of ultrasonic goniometric signal between a device to be measured and a goniometric device according to one or more examples of this disclosure.

FIG. 2 is a schematic diagram illustrating transmission of ultrasonic goniometric signal between a device to be measured and a goniometric device according to some embodiments of this disclosure. As shown in FIG. 2, for each frequency band, the ultrasonic goniometric signals sent by 4 devices to be measured can be received in 4 time slots.

For example, for the first frequency band, the receiving time may be divided into four time slots (which may be periodic) at the goniometric device, e.g., slot #1, slot #2, slot #3, and slot #4. The ultrasonic goniometric signal sent by Sub1 may be received on slot #1, the ultrasonic goniometric signal sent by Sub2 may be received on slot #2, the ultrasonic goniometric signal sent by Sub3 may be received on slot #3, and the ultrasonic goniometric signal sent by Sub4 may be received on slot #4.

For the second frequency band, the receiving time may also be divided into four time slots at the goniometric device, e.g., slot #1, slot #2, slot #3, and slot #4. The ultrasonic goniometric signal sent by Sub5 may be received on slot #1, the ultrasonic goniometric signal sent by Sub6 may be received on slot #2, the ultrasonic goniometric signal sent by Sub7 may be received on slot #3, and the ultrasonic goniometric signal sent by Sub8 may be received on slot #4.

Accordingly, for the devices to be measured that transmit ultrasonic goniometric signals through the same frequency band, the sending time of the ultrasonic goniometric signals can be determined according to their corresponding receiving time slots, transmission durations and synchronization errors, thereby enabling the goniometric device to receive the ultrasonic goniometric signals sent by different devices to be measured in different receiving time slots.

Figure 3:
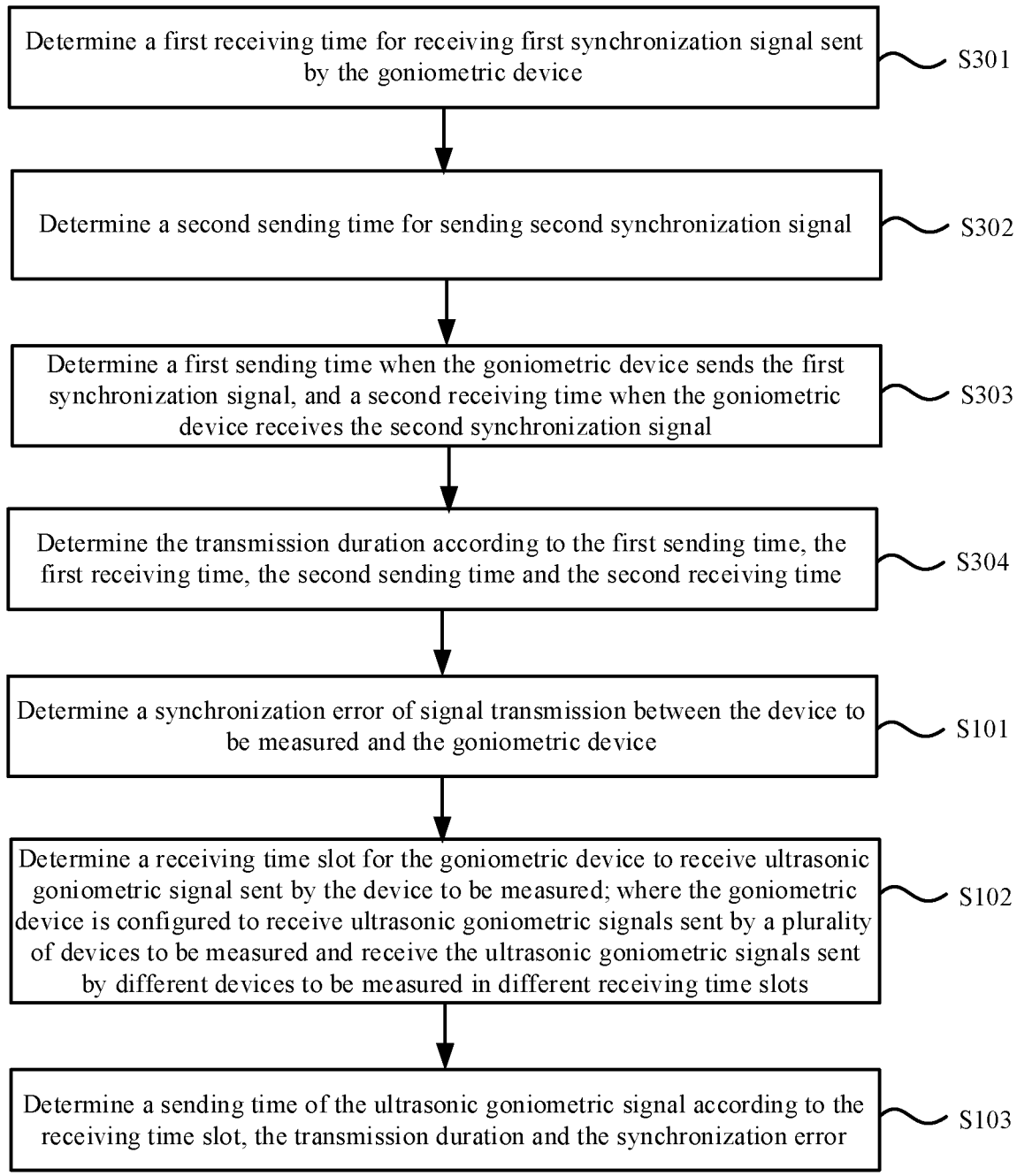
FIG. 3 is a schematic diagram of a sending time determination method according to one or more examples of this disclosure.

FIG. 3 is a schematic diagram of a sending time determination method according to some other embodiments of this disclosure. As shown in FIG. 3, the determining of the transmission duration of the signal transmission between the device to be measured and the goniometric device includes following steps.

In step S301, a first receiving time for receiving first synchronization signal sent by the goniometric device is determined.

In step S302, a second sending time for sending second synchronization signal is determined.

In step S303, a first sending time when the goniometric device sends the first synchronization signal, and a second receiving time when the goniometric device receives the second synchronization signal are determined.

In step S304, the transmission duration is determined according to the first sending time, the first receiving time, the second sending time and the second receiving time.

In some embodiments, the first synchronization signal and the second synchronization signal may be ultrasound signals. When the device to be measured sends the second synchronization signal to the goniometric device and when the goniometric device sends the first synchronization signal to the device to be measured, the synchronization signals may be sent repeatedly multiple times, thereby ensuring that the receiver can receive the synchronization signal accurately. Moreover, a preset interval may be configured between two repeated transmissions, thereby being beneficial to avoid mutual interference between continuously transmitted synchronization signals.

In some embodiments, the device to be measured receives the first synchronization signal sent by the goniometric device, and records the receiving time when the first synchronization signal is received as the first receiving time.

In some embodiments, the first synchronization signal includes at least one of: a first frequency sweep signal; the number of packets; at least one data block. Herein, the first frequency sweep signal may be used for the device to be measured to determine the first receiving time; the number of packets may be used for indicating the number of data blocks carried in the first synchronization signal; and the data block(s) may be used for carrying first delay information of the device to be measured and identification information of the device to be measured.

In some embodiments, the identification information may be sent by the device to be measured to the goniometric device through a local area network in advance, and the first delay information may be preconfigured by the goniometric device.

In some embodiments, if the goniometric device performs signal interaction with different devices to be measured through multiple frequency bands, the first synchronization signal may include identification information and first delay information of multiple devices to be measured that perform signal interaction with the goniometric device through the same frequency band.

Figure 4:
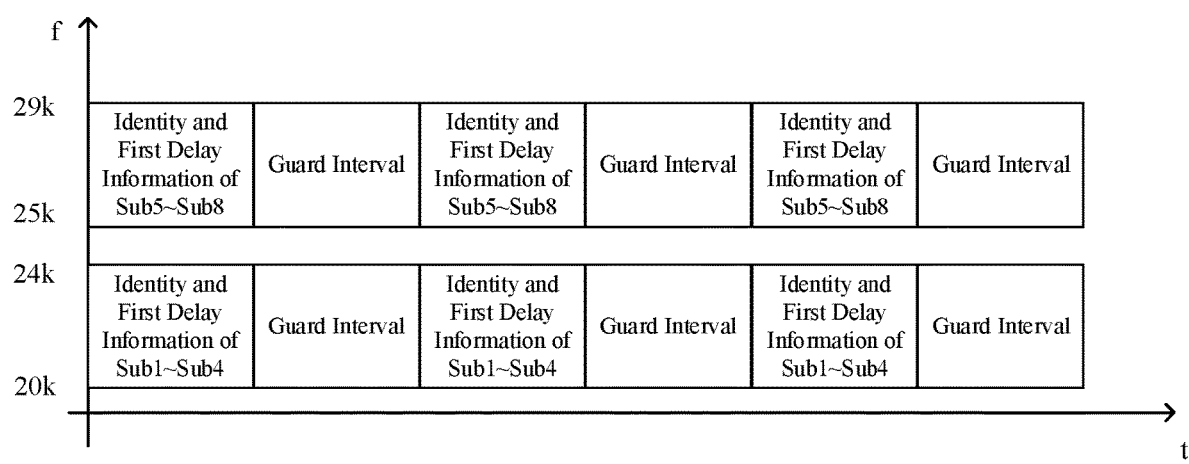
FIG. 4 is a schematic diagram of a sending time determination method according to one or more examples of this disclosure.

FIG. 4 is a schematic diagram of sending the first synchronization signal according to some embodiments of this disclosure. As shown in FIG. 4, the goniometric device performs signal interaction with the devices to be measured Sub1, Sub2, Sub3, Sub4 through the first frequency band (20 khz-24 khz), and with the devices to be measured Sub5, Sub6, Sub7, Sub7 through the second frequency band (25 khz-29 khz). The goniometric device may repeatedly send three times through the first frequency band the first synchronization signal containing the identification information and the first delay information of the devices to be measured Sub1, Sub2, Sub3, Sub4, and a guard interval with a preset time length is configured between two transmissions. The goniometric device may also repeatedly send three times through the second frequency band the first synchronization signal containing the identification information and the first delay information of the devices to be measured Sub5, Sub6, Sub7, Sub8, and a guard interval with a preset time length is configured between two transmissions.

In some embodiments, the determining the first receiving time for receiving the first synchronization signal sent by the goniometric device includes: determining the first receiving time according to signal correlation of the first frequency sweep signal.

After receiving the first synchronization signal, the device to be measured may detect the arrival time of the first synchronization signal according to correlation detection of the first frequency sweep signal contained in the first synchronization signal, and parse the data block(s) contained in the first synchronization signal according to the number of packets contained in the first synchronization signal, thereby determining the first time delay information corresponding to its identification information.

In some embodiments, the determining the second sending time for sending the second synchronization signal includes: determining the first delay information corresponding to the device to be measured by parsing the first synchronization signal; and determining the second sending time according to the first receiving time and the first delay information.

The device to be measured may start timing from the first receiving time when the first synchronization signal is received, and wait for the preset duration indicated by the first delay information according to the first delay information obtained by parsing. When the timing duration reaches the preset duration, the second synchronization signal is sent.

In some embodiments, when the device to be measured sends the second synchronization signal, it may be unable to obtain the sending time of the second synchronization signal due to its own computer settings. Therefore, after sending the second synchronization signal, the device to be measured may determine the receiving time when the device to be measured itself receives the second synchronization signal according to the correlation of the second frequency sweep signal carried in the second synchronization signal, and determine the receiving time as the second sending time of the second synchronization signal.

In some embodiments, the second synchronization signal includes the second frequency sweep signal, the second frequency sweep signal is used for the goniometric device to determine the second receiving time, and the second frequency sweep signal is different from the first frequency sweep signal.

In some embodiments, the second frequency sweep signal included in the second synchronization signal sent by the device to be measured and the first frequency sweep signal included in the first synchronization signal sent by the goniometric device may be sweep signal obtained by frequency sweeping in different manners. In this way, the device to be measured and the goniometric device can distinguish the received synchronization signal through the frequency sweep signal included therein after receiving the synchronization signal, so as to avoid false detection.

In some embodiments, determining the first sending time when the goniometric device sends the first synchronization signal, and determining the second receiving time when the goniometric device receives the second synchronization signal includes: receiving third synchronization signal sent by the goniometric device, where the third synchronization signal carries the first sending time and the second receiving time.

In some embodiments, after the device to be measured sends the second synchronization signal to the goniometric device, the goniometric device may record the second receiving time when the second synchronization signal is received, and the goniometric device may record the first sending time of the first synchronization signal upon sending the first synchronization signal to the device to be measured. Accordingly, the goniometric device may send to the device to be measured the third synchronization signal carrying the first sending time and the second receiving time as recorded.

The manner in which the goniometric device records the second receiving time and the first sending time may refer to the relevant content about the device to be measured determining the first receiving time and the second sending time in the foregoing embodiments, which will not be repeated here.

In some embodiments, the third synchronization signal received by the device to be measured may include the correspondence between multiple devices to be measured and the first sending time, the second receiving time recorded by the goniometric device. So, the device to be measured may determine the first sending time and the second receiving time corresponding to its own identification information by parsing the third synchronization signal after receiving the third synchronization signal.

In some embodiments, after determining the first sending time and the first receiving time of the first synchronization signal, and the second sending time and second receiving time of the second synchronization signal, the device to be measured may determine the transmission duration of the signal transmission between the device to be measured and the goniometric device by using the following formula (1):

$$d=[(t4-t1)-(t3-t2)]/2 \quad (1)$$

Herein, d represents the transmission duration of the signal transmission between the device to be measured and the goniometric device, t4 represents the second receiving time of the second synchronization signal, t1 represents the first sending time of the first synchronization signal, and t3 represents the sending time of the second synchronization signal, and t2 represents the first receiving time of the first synchronization signal.

Figure 5:
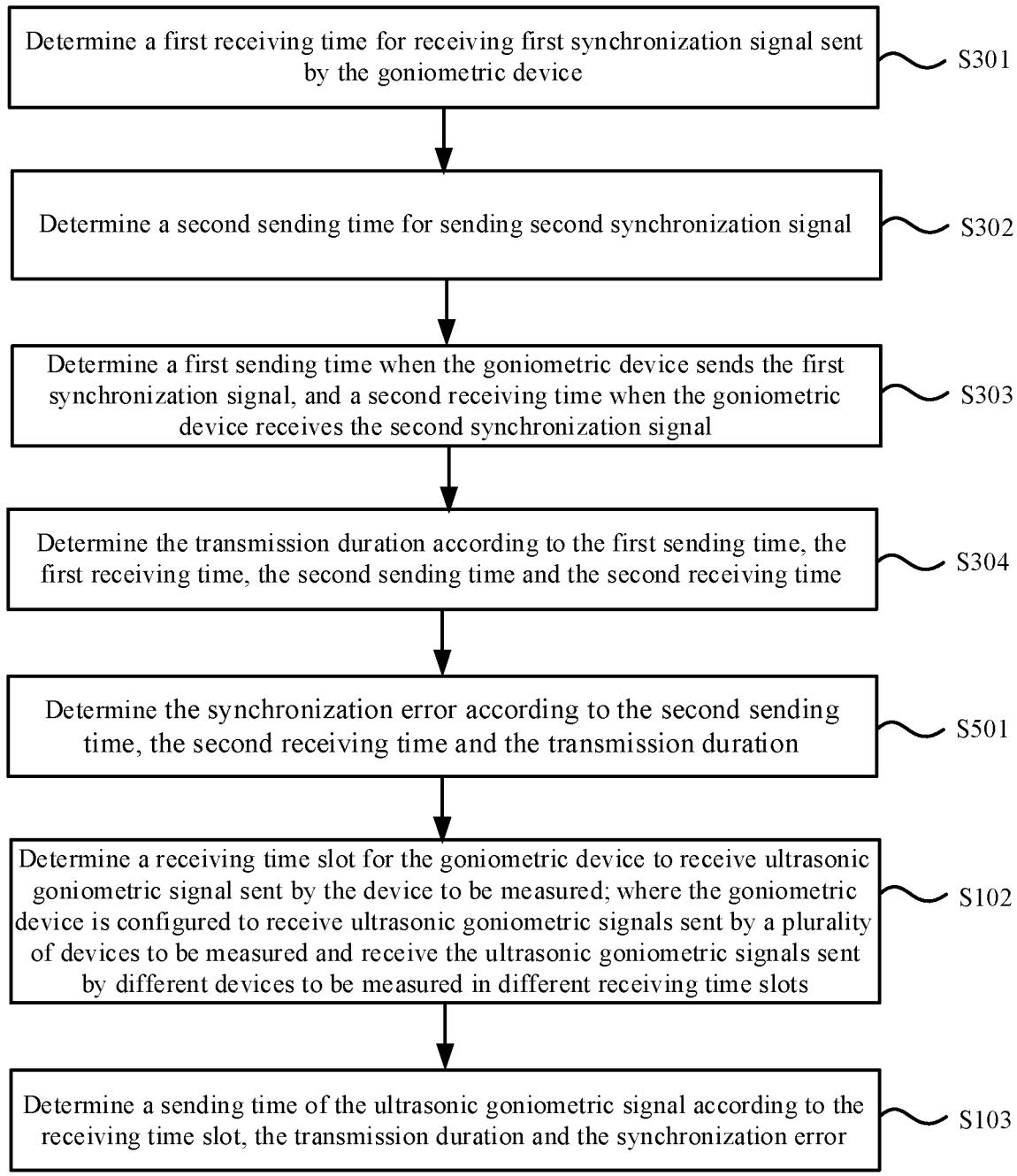
FIG. 5 is a schematic diagram of an indoor goniometric method according to one or more examples of this disclosure.

FIG. 5 is a schematic diagram of a sending time determination method according to some other embodiments of this disclosure. As shown in FIG. 5, on the basis of the embodiment shown in FIG. 3, the determining of the synchronization error between the goniometric device and the device to be measured includes a following step.

In step S501, the synchronization error is determined according to the second sending time, the second receiving time and the transmission duration.

In some embodiments, since there may be a clock synchronization error in the recording threads used by the goniometric device and the device to be measured for receiving the synchronization signals, the time difference between receiving time and sending time of the signal may be inconsistent with the transmission duration of the signal when the signal transmission is performed between the device to be measured and the goniometric device. Accordingly, the synchronization error between the device to be measured and the goniometric device may be determined by the following formula (2):

$$\Lambda=t4-t3-d \quad (2)$$

Herein, Λ represents the synchronization error between the device to be measured and the goniometric device, t4 represents the receiving time of the second synchronization signal, t3 represents the sending time of the second synchronization signal, and d represents the transmission duration of signal transmission between the device to be measured and the goniometric device.

In some embodiments, after the device to be measured determines the transmission duration of the signal transmission between the device to be measured and the goniometric device and the synchronization error between the device to be measured and the goniometric device, if it is determined that the goniometric device is to receive the ultrasonic goniometric signal sent by the device to be measured in a receiving slot $T_r$, then the sending time of the ultrasonic goniometric signal may be determined by the following formula (3):

$$T_t=T_r-d-\Lambda \quad (3)$$

Herein, $T_t$ represents the sending time of the ultrasonic goniometric signal sent by the device to be measured, $T_r$ represents the receiving time slot of the ultrasonic goniometric signal sent by the device to be measured, d represents the transmission duration of signal transmission between the device to be measured and the goniometric device, and Λ represents the synchronization error between the device to be measured and the goniometric device.

In the scenario where the goniometric device performs indoor goniometric measurement on a plurality of devices to be measured, each device to be measured may calculate the sending time for sending the ultrasonic goniometric signal according to the above formulas.

For example, the goniometric device performs indoor goniometric measurement on n devices to be measured, the transmission duration determined by the i-th device to be measured among the n devices to be measured is $d_i$, and the determined synchronization error is $\Lambda_i$. For the i-th device to be measured, the goniometric device may determine that the receiving time slot for receiving the ultrasonic goniometric signal is $T_{ri}$. Based on $T_{ri}$, $d_i$ and $\Lambda_i$, the i-th device to be measured can determine $T_i$ and send the ultrasonic goniometric signal to the goniometric device at $T_i$, which can ensure that the goniometric device receives the ultrasonic goniometric signal sent by the i-th device to be measured at $T_{ri}$. Similarly, the goniometric device receives the ultrasonic goniometric signal sent by the (i+1)-th device to be measured at $T_{r(i+1)}$. Accordingly, in this way, it can be ensured that ultrasonic goniometric signals sent by different devices to be measured can be received by the goniometric device in different time slots.

It can be seen from the above technical solutions provided by this disclosure that, the device to be measured can determine the transmission duration and synchronization error of signal transmission with the goniometric device, for example, by performing signal interaction with the goniometric device. It may further determine the receiving time slot required by the goniometric device to receive the ultrasonic goniometric signal, for example, through indication of the goniometric device.

Furthermore, when the transmission duration and synchronization error are determined, based on the receiving time slot required by the goniometric device, the sending time of the ultrasonic goniometer signal can be accurately determined, so that the ultrasonic goniometer signal can be received by the goniometric device in the receiving time slot required by the goniometric device, thereby enabling the goniometric device to accurately control the receiving time, and to receive the ultrasonic goniometer signals sent by different devices to be measured in different receiving time slots, so as to avoid the difficulty in distinguishing ultrasonic goniometric signals sent by different devices to be measured, and achieve accurate goniometric measurement for different devices to be measured.

Figure 6:
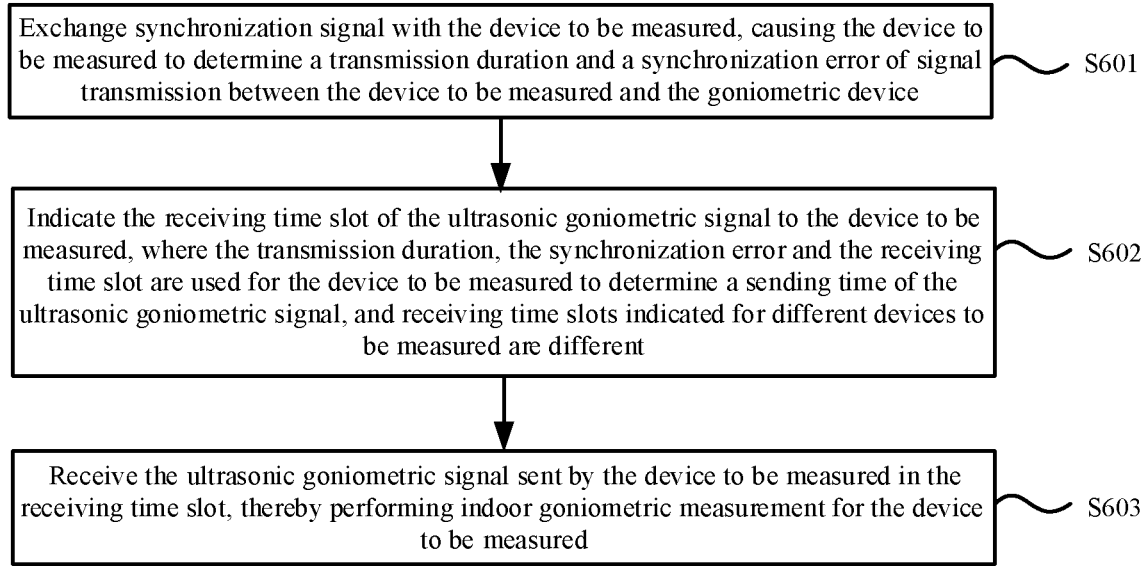
FIG. 6 is a schematic diagram of an indoor goniometric method according to one or more examples of this disclosure.

FIG. 6 is a schematic flowchart of an indoor goniometric method according to some embodiments of this disclosure. The indoor goniometric method shown in some embodiments may be performed by the goniometric device, and the goniometric device may communicate with the device to be measured, and the goniometric device and the device to be measured include but are not limited to communication devices such as mobile phones, tablet computers, wearable devices, sensors, IoT devices, and the like.

As shown in FIG. 6, the indoor goniometric method may include the following steps.

In step 601, synchronization signal is exchanged with the device to be measured, causing the device to be measured to determine a transmission duration and a synchronization error of signal transmission between the device to be measured and the goniometric device.

In step 602, the receiving time slot of the ultrasonic goniometric signal is indicated to the device to be measured, where the transmission duration, the synchronization error and the receiving time slot are used for the device to be measured to determine a sending time of the ultrasonic goniometric signal, and receiving time slots indicated for different devices to be measured are different.

In step 603, the ultrasonic goniometric signal sent by the device to be measured is received in the receiving time slot, thereby performing indoor goniometric measurement for the device to be measured.

All the embodiments of this disclosure are mainly applied to the scenario where the goniometric device performs indoor goniometric measurement on multiple devices to be measured. The goniometric device can perform indoor goniometric measurement by receiving ultrasonic goniometric signal sent by the device to be measured, and the specific goniometric algorithm includes, but is not limited to, the cross-correlation first-arrival-path estimation method. However, in the scenario where the goniometric device performs indoor goniometric measurements on multiple devices to be measured, the goniometric device may receive ultrasonic goniometric signals from multiple devices to be measured (e.g., in the same time slot). The ultrasonic goniometric signals sent by the devices to be measured may interfere with each other, so that the goniometric device cannot distinguish the received ultrasonic goniometric signals from each other, and thus cannot accurately perform the indoor goniometric measurements for the multiple devices to be measured.

For example, the goniometric device performs indoor goniometric measurements on n devices to be measured. Since the relationship between each device to be measured and the goniometric device may be different, such as different distances, different angles, and different obstacles on the signal propagation path, these factors may cause the transmission duration of ultrasonic goniometric signals from different devices to be measured to the goniometric device to be different.

If the sending time of the ultrasonic goniometric signal sent by the device to be measured is controlled according to only the receiving time as required, it will be difficult to accurately control the actual receiving time of the ultrasonic goniometric signal received by the goniometric device when the transmission duration is unknown. Moreover, in addition to the different sending times, different devices to be measured will have different synchronization errors with the goniometric device, which will also make it difficult to accurately control the receiving time.

Furthermore, when it is difficult to accurately control the receiving time, it is possible to receive the ultrasonic goniometric signals sent by multiple devices to be measured in the same time slot, which makes it difficult to distinguish the ultrasonic goniometric signals sent by different devices to be measured, and thus unable to perform accurate goniometric measurement for each device to be measured.

In some embodiments, the transmission duration and synchronization error of the signal transmission between the device to be measured and the goniometric device can be determined by exchanging synchronization signals between the device to be measured and the goniometric device. For details, relevant content in the exemplary embodiment shown in FIG. 7 may be referred to, which is not described here.

In some embodiments, the goniometric device may indicate to the device to be measured the receiving time slot for the goniometric device to receive the ultrasonic goniometric signal sent by the device to be measured, so that the device to be measured can determine the sending time for sending the ultrasonic goniometric signal according to the transmission duration, synchronization error as determined and the receiving time slot indicated by the goniometric device. For example, the goniometric device may configure a correspondence between the devices to be measured and the receiving time slots, and indicate to a device to be measured the receiving time slot for the goniometric device to receive the ultrasonic goniometer signal sent by the device to be measured by sending the correspondence to the device to be measured.

In some embodiments of this disclosure, the goniometric device may enable the device to be measured to determine the transmission duration and synchronization error of signal transmission with the goniometric device by exchanging synchronization signals with the device to be measured. The goniometric device may further indicate to the device to be measured the receiving time slot of the ultrasonic signal, thereby enabling the device to be measured to determine the receiving time slot required by the goniometric device for receiving the ultrasonic goniometric signal.

Furthermore, when the transmission duration and synchronization error are determined, based on the receiving time slot indicated by the goniometric device, the device to be measured is able to accurately determine the sending time of the ultrasonic goniometer signal. Accordingly, the ultrasonic goniometer signal sent by the device to be measured can be received by the goniometric device in the receiving time slot required by the goniometric device, thereby enabling the goniometric device to accurately control the receiving time, and to receive the ultrasonic goniometer signals sent by different devices to be measured in different receiving time slots, so as to avoid the difficulty in distinguishing ultrasonic goniometric signals sent by different devices to be measured, and achieve accurate goniometric measurement for different devices to be measured.

It should be noted that some embodiments of this disclosure may be applied to a scenario where the goniometric device performs indoor goniometric measurement on multiple devices to be measured. In other words, the goniometric device may perform the method according to embodiments of this disclosure on each device to be measured in such scenario.

For example, the goniometric device performs goniometric measurement on n devices to be measured. Through exchanging synchronization signals with the i-th device to be measured among the n devices to be measured, the i-th device to be measured is able to determine the transmission duration (referred to as the i-th transmission duration) of signal transmission with the goniometric device, and the synchronization error (referred to as the i-th synchronization error) of signal transmission with the goniometric device. Moreover, the goniometric device may indicate to the i-th device to be measured to receive the ultrasonic goniometric signal at the i-th time slot. Accordingly, based on the i-th time slot, the i-th transmission duration, and the i-th synchronization error, the i-th device to be measured can determine the i-th sending time, and send the ultrasonic goniometric signal to the goniometric device at the i-th sending time, thereby enabling the goniometric device to receive the ultrasonic goniometric signal sent by the i-th device to be measured in the i-th time slot. Similarly, the goniometric device receives the ultrasonic goniometric signal sent by the (i+1)-th device to be measured in the (i+1)-th time slot. As seen in this way, the ultrasonic goniometric signals sent by different devices to be measured can be received by the goniometric device in different time slots.

Therefore, according to some embodiments, it can be ensured that the goniometric device receives the ultrasonic goniometric signal sent by only one device to be measured in one time slot, so as to prevent the ultrasonic goniometric signals sent by multiple devices to be measured from reaching the goniometric device in the same time slot to cause interference with each other, thereby enabling the goniometric device to accurately receive and distinguish the ultrasonic goniometric signals of each device to be measured, and realize indoor goniometric measurement on multiple devices to be measured.

It should be noted that, when referring to "indicating different receiving time slots to different devices to be measured" in some embodiments of this disclosure, it may refer to multiple devices to be measured which send ultrasonic goniometric signals to the goniometric device in the same frequency band. The manner in which the multiple devices to be measured send the goniometric signals in such frequency band may be understood as time division multiple access (TDMA).

In some other embodiments of this disclosure, in addition to receiving the ultrasonic goniometric signals sent by different devices to be measured in different receiving time slots, the goniometric device may also receive ultrasonic goniometric signals sent by different devices to be measured in different frequency bands. Herein, the manner in which the multiple devices to be measured send the goniometric signals in different frequency bands may be understood as frequency division multiple access (FDMA).

In some embodiments, when the goniometric device needs to receive ultrasonic goniometric signals sent by N (N>1) devices to be measured, M (M>1) frequency bands may be divided for the goniometric device, and each frequency band corresponds to N/M devices to be measured. For example, if the goniometric device needs to perform indoor goniometric measurement on 8 devices to be measured (e.g., Sub1, Sub2, . . . , Sub8), and receive ultrasonic goniometric signals sent by these 8 devices to be measured, 2 different frequency bands may be determined for the goniometric device, for example, including the first frequency band (e.g., 20 khz-24 khz) and the second frequency band (e.g., 25 khz-29 khz), and the 8 devices to be measured may be divided into two groups. Then, signal interaction may be performed with 4 of the 8 devices to be measured (e.g., Sub1, Sub2, Sub3, and Sub4) through the first frequency band, and with the other 4 devices to be measured (e.g., Sub5, Sub6, Sub7, Sub8) through the second frequency band.

As shown in FIG. 2, for each frequency band, the ultrasonic goniometric signals sent by 4 devices to be measured can be received in 4 time slots.

For example, for the first frequency band, the receiving time may be divided into four time slots at the goniometric device, e.g., slot #1, slot #2, slot #3, and slot #4. The ultrasonic goniometric signal sent by Sub1 may be received on slot #1, the ultrasonic goniometric signal sent by Sub2 may be received on slot #2, the ultrasonic goniometric signal sent by Sub3 may be received on slot #3, and the ultrasonic goniometric signal sent by Sub4 may be received on slot #4.

For the second frequency band, the receiving time may also be divided into four time slots at the goniometric device, e.g., slot #1, slot #2, slot #3, and slot #4. The ultrasonic goniometric signal sent by Sub5 may be received on slot #1, the ultrasonic goniometric signal sent by Sub6 may be received on slot #2, the ultrasonic goniometric signal sent by Sub7 may be received on slot #3, and the ultrasonic goniometric signal sent by Sub8 may be received on slot #4.

Accordingly, for the devices to be measured that transmit ultrasonic goniometric signals through the same frequency band, the sending time of the ultrasonic goniometric signals can be determined according to their corresponding receiving time slots, transmission durations and synchronization errors, thereby enabling the goniometric device to receive the ultrasonic goniometric signals sent by different devices to be measured in different receiving time slots.

Figure 7:
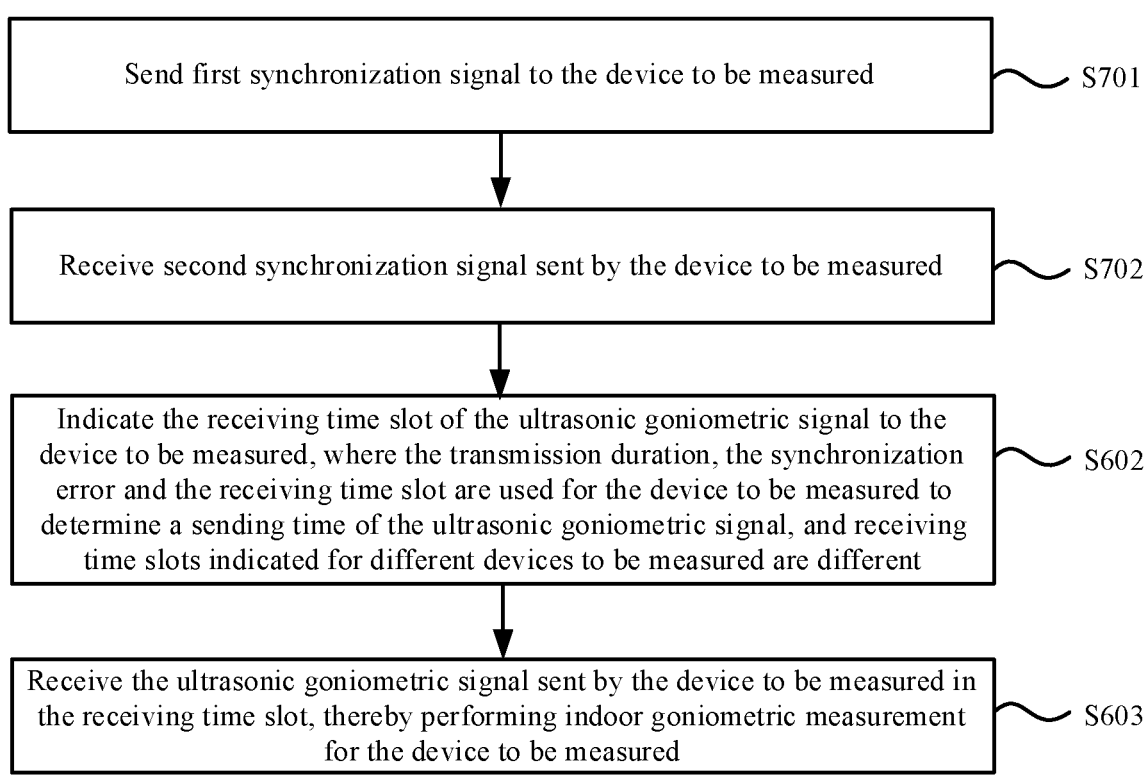
FIG. 7 is a schematic diagram of an indoor goniometric method according to one or more examples of this disclosure.

FIG. 7 is a schematic flowchart of an indoor goniometric method according to some other embodiments of this disclosure. As shown in FIG. 7, on the basis of the embodiments shown in FIG. 6, synchronization signals are exchanged with the device to be measured, so that the device to be measured determines the transmission duration and synchronization errors by following steps.

In step S701, first synchronization signal is sent to the device to be measured.

In step S702, second synchronization signal sent by the device to be measured is received.

Herein, the first sending time and the first receiving time of the first synchronization signal, the second sending time and the second receiving time of the second synchronization signal are used for the device to be measured to determine the transmission duration and synchronization error of signal transmission with the goniometric device.

In some embodiments, the goniometric device may record the sending time of the first synchronization signal upon sending the first synchronization signal to the device to be measured. The goniometric device may further receive the second synchronization signal returned by the device to be measured according to the received first synchronization signal, and record the receiving time of the second synchronization signal.

In some embodiments, after receiving the second synchronization signal sent by the device to be measured, the goniometric device may send to the device to be measured third synchronization signal which carries the sending time of the first synchronization signal and the receiving time of the second synchronization signal recorded by itself.

Figure 8:
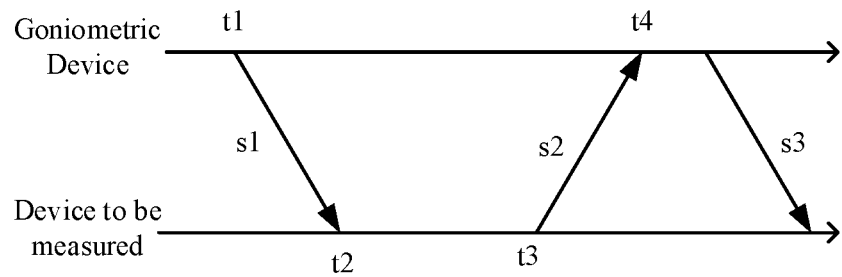
FIG. 8 is a block diagram of a sending time determination device according to one or more examples of this disclosure.

FIG. 8 is a schematic diagram illustrating interaction of synchronization signals between the goniometric device and the device to be measured according to some embodiments of this disclosure. As shown in FIG. 8, the goniometric device may send first synchronization signal s1 to the device to be measured, and record the first sending time of the first synchronization signal s1 as t1. After the first synchronization signal s1 arrives at the device to be measured, the device to be measured may record the first receiving time when the first synchronization signal s1 is received as t2.

After receiving the first synchronization signal s1, the device to be measured may determine the first delay information corresponding to itself by parsing the first synchronization signal s1, send second synchronization signal s2 after waiting for a preset duration according to the first delay information obtained through the parsing, and record the sending time of the second synchronization signal s2 as t3. The goniometric device may receive the second synchronization signal s2 sent by the device to be measured, and record the second receiving time of receiving the second synchronization signal s2 as t4.

Further, the goniometric device may send to the device to be measured third synchronization signal s3 which carries the first sending time t1 and the second receiving time t4 recorded by itself, so that the device to be measured is able to determine the first sending time and the first receiving time of the first synchronization signal, as well as the second sending time and the second receiving time of the second synchronization signal. Accordingly, the device to be measured may determine the transmission duration of signal transmission between the device to be measured and the goniometric device according to the above formula (1), and determine the synchronization error of signal transmission between the device to be measured and the goniometric device according to the above formula (2).

In some embodiments, the first synchronization signal and the second synchronization signal may be ultrasound signals. When the device to be measured sends the second synchronization signal to the goniometric device and when the goniometric device sends the first synchronization signal to the device to be measured, the synchronization signals may be sent repeatedly multiple times, thereby ensuring that the receiver can receive the synchronization signal accurately. Moreover, a preset interval may be configured between two repeated transmissions, thereby being beneficial to avoid mutual interference between continuously transmitted synchronization signals.

In some embodiments, the first synchronization signal includes at least one of: a first frequency sweep signal; the number of packets; at least one data block. Herein, the first frequency sweep signal may be used for the device to be measured to determine the first receiving time; the number of packets may be used for indicating the number of data blocks carried in the first synchronization signal; and the data block(s) may be used for carrying first delay information of the device to be measured and identification information of the device to be measured.

In some embodiments, before sending the first synchronization signal, the goniometric device may receive identification information sent by the device to be measured through a local area network, and configure the first delay information for each device to be measured that needs to perform indoor goniometric measurement.

In some embodiments, if the goniometric device performs signal interaction with different devices to be measured through multiple frequency bands, the first synchronization signal may include identification information and first delay information of the multiple devices to be measured that perform signal interaction with the goniometric device through the same frequency band.

As shown in FIG. 4, the goniometric device performs signal interaction with the devices to be measured Sub1, Sub2, Sub3, Sub4 through the first frequency band (20 khz-24 khz), and with the devices to be measured Sub5, Sub6, Sub7, Sub7 through the second frequency band (25 khz-29 khz). The goniometric device may repeatedly send three times through the first frequency band the first synchronization signal containing the identification information and the first delay information of the devices to be measured Sub1, Sub2, Sub3, Sub4, and a guard interval with a preset time length is configured between two transmissions. The goniometric device may also repeatedly send three times through the second frequency band the first synchronization signal containing the identification information and the first delay information of the devices to be measured Sub5, Sub6, Sub7, Sub8, and a guard interval with a preset time length is configured between two transmissions.

In some embodiments, when the goniometric device sends the first synchronization signal, it may be unable to obtain the sending time of the first synchronization signal due to its own computer settings. Therefore, after sending the first synchronization signal, the goniometric device may determine the receiving time when the goniometric device itself receives the first synchronization signal according to the correlation of the first frequency sweep signal carried in the first synchronization signal, and determine the receiving time as the first sending time of the first synchronization signal.

In some embodiments, the second synchronization signal includes second frequency sweep signal, the second frequency sweep signal is used for the goniometric device to determine the second receiving time, and the second frequency sweep signal is different from the first frequency sweep signal.

In some embodiments, the second frequency sweep signal included in the second synchronization signal sent by the device to be measured and the first frequency sweep signal included in the first synchronization signal sent by the goniometric device may be sweep signal obtained by frequency sweeping in different manners. In this way, the device to be measured and the goniometric device can distinguish the received synchronization signal through the frequency sweep signal included therein after receiving the synchronization signal, so as to avoid false detection.

Corresponding to the above embodiments of the sending time determination method, this disclosure further provides embodiments of the sending time determination device.

Figure 9:
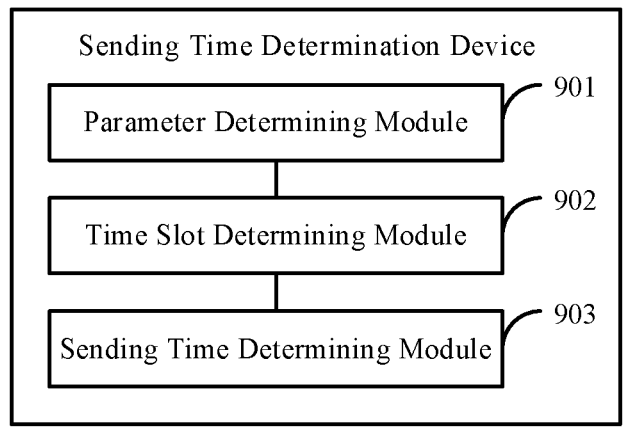
FIG. 9 is a block diagram of an indoor goniometric device according to one or more examples of this disclosure.

FIG. 9 is a block diagram of a sending time determination device according to some embodiments of this disclosure. As shown in FIG. 9, the device may be a terminal, or a device composed of modules in the terminal, and the terminal includes but is not limited to electronic devices such as mobile phones, tablet computers, wearable devices, sensors, and IoT devices. The terminal, as the user equipment, may communicate with a base station, and the base station includes but is not limited to a 4G base station, a 5G base station, a 6G base station and the like.

As shown in FIG. 9, the sending time determination device may include:

a parameter determining module 901, configured to determine a transmission duration and a synchronization error of signal transmission between the device to be measured and a goniometric device;

a time slot determining module 902, configured to determine a receiving time slot for the goniometric device to receive ultrasonic goniometric signal sent by the device to be measured, where the goniometric device is configured to receive ultrasonic goniometric signals sent by a plurality of devices to be measured, and the goniometer device receives the ultrasonic goniometric signals sent by different devices to be measured in different receiving time slots; and a sending time determining module 903, configured to determine a sending time of the ultrasonic goniometric signal according to the receiving time slot, the transmission duration and the synchronization error.

Optionally, the parameter determination module includes: a first time determination submodule, configured to determine a first receiving time for receiving the first synchronization signal sent by the goniometric device; a second time determination submodule, configured to determine a second sending time for sending the second synchronization signal; a third time determining submodule, configured to determine a first sending time when the goniometric device sends the first synchronization signal, and a second receiving time when the goniometric device receives the second synchronization signal; and a transmission duration determination submodule, configured to determine the transmission duration according to the first sending time, the first receiving time, the second sending time and the second receiving time.

Optionally, the parameter determination module includes a synchronization error determination submodule configured to determine the synchronization error according to the second sending time, the second receiving time and the transmission duration.

Optionally, the first synchronization signal includes at least one of the following: first frequency sweep signal; the number of packets; and at least one data block; where the first frequency sweep signal is used for the device to be measured to determine the first receiving time, the number of packets is used for indicating the number of data blocks carried in the first synchronization signal, and the data block(s) is used for carrying first delay information of the device to be measured and identification information of the device to be measured.

Optionally, the second time determination submodule is configured to: determine the first delay information corresponding to the device to be measured by parsing the first synchronization signal; and determine the second sending time according to the first receiving time and the first delay information.

Optionally, the second synchronization signal includes second frequency sweep signal, the second frequency sweep signal is used for the goniometric device to determine the second receiving time, and the second frequency sweep signal is different from the first frequency sweep signal.

Optionally, the third time determination submodule is configured to receive third synchronization signal sent by the goniometric device, where the third synchronization signal carries the first sending time and the second receiving time.

Figure 10:
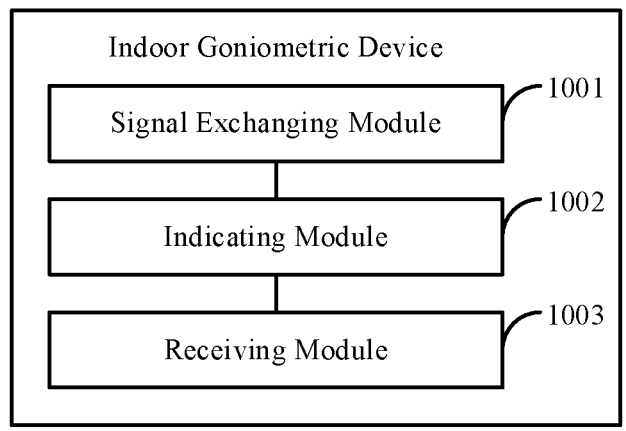
FIG. 10 is a block diagram of a terminal according to one or more examples of this disclosure.

FIG. 10 is a block diagram of an indoor goniometric device according to some embodiments of this disclosure. As shown in FIG. 10, the device may be a terminal, or a device composed of modules in the terminal, and the terminal includes but is not limited to electronic devices such as mobile phones, tablet computers, wearable devices, sensors, and IoT devices. The terminal, as user equipment, may communicate with a base station, and the base station includes but is not limited to a 4G base station, a 5G base station, a 6G base station and the like.

As shown in FIG. 10, the indoor goniometric device may include:

a signal exchanging module 1001, configured to exchange synchronization signal with a device to be measured, causing the device to be measured to determine a transmission duration and a synchronization error of signal transmission between the device to be measured and the goniometric device;

an indicating module 1002, configured to indicate to the device to be measured a receiving time slot of ultrasonic goniometric signal, where the transmission duration, the synchronization error and the receiving time slot are used for the device to be measured to determine a sending time of the ultrasonic goniometric signal, and receiving time slots indicated for different devices to be measured are different; and a receiving module 1003, configured to receive the ultrasonic goniometric signal sent by the device to be measured in the receiving time slot, thereby performing indoor goniometric measurement for the device to be measured.

Optionally, the signal exchanging module is configured to send first synchronization signal to the device to be measured; and receive second synchronization signal sent by the device to be measured; where first sending time and first receiving time of the first synchronization signal, and second sending time and second receiving time of the second synchronization signal are used for the device to be measured to determine the transmission duration and the synchronization error of the signal transmission between the device to be measured and the goniometric device.

Optionally, the first synchronization signal includes at least one of the following: first frequency sweep signal; the number of packets; and at least one data block; where the first frequency sweep signal is used for the device to be measured to determine the first receiving time, the number of packets is used for indicating the number of data blocks carried in the first synchronization signal, and the data block(s) is used for carrying first delay information of the device to be measured and identification information of the device to be measured.

Optionally, the second synchronization signal includes second frequency sweep signal, the second frequency sweep signal is used for the goniometric device to determine the second receiving time, and the second frequency sweep signal is different from the first frequency sweep signal.

For details of the implementation process of the purposes and functions of each unit in the above device, reference may be made to the implementation process of the corresponding steps in the above method, which will not be repeated here.

For the device embodiments, since they basically correspond to the method embodiments, reference may be made to the related part of descriptions in the method embodiments. The device embodiments described above are only illustrative, where the units/modules described as separate components may be or may not be physically separated, and the components shown as units/modules may be or may not be physical units, that is, they may be located in one place, or it may be distributed over multiple network elements. Some or all of the modules may be selected according to actual needs to achieve the purpose of the solution of this disclosure. Those of ordinary skill in the art can understand and implement it without creative effort.

Embodiments of this disclosure also provide a terminal, including:
- a processor;
- a memory for storing executable instructions of the processor;
- where the processor is configured to implement the sending time determination method described in any of the foregoing embodiments.

Embodiments of this disclosure also provide a terminal, including:
- a processor;
- a memory for storing executable instructions of the processor;
- where the processor is configured to implement the indoor goniometric method described in any of the foregoing embodiments.

Embodiments of this disclosure further provide a computer-readable storage medium, on which a computer program is stored, and the program is used for, when being executed by a processor, implementing the steps in the sending time determination method described in any of the foregoing embodiments.

Embodiments of this disclosure further provide a computer-readable storage medium, on which a computer program is stored, and the program is used for, when being executed by a processor, implementing the steps in the indoor goniometric method described in any of the foregoing embodiments.

Figure 11:
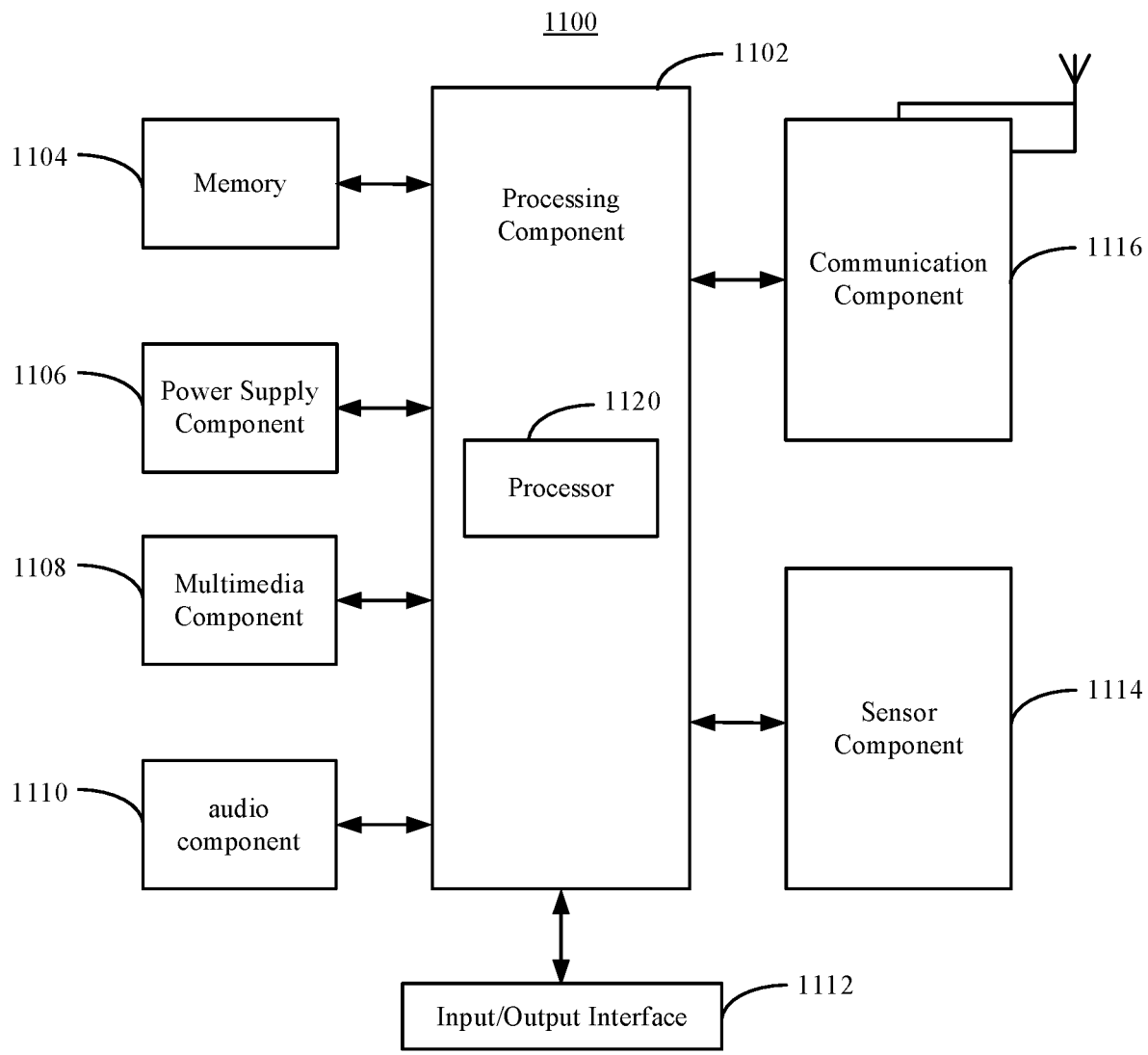
FIG. 11 is a block diagram of a terminal according to one or more examples of this disclosure.

FIG. 11 is a block diagram of a terminal 1100 according to some embodiments of this disclosure. For example, terminal 1100 may be a mobile phone, computer, digital broadcast terminal, messaging device, game console, tablet device, medical device, fitness device, personal digital assistant, and the like.

Referring to FIG. 11, the terminal 1100 may include one or more of the following components: a processing component 1102, a memory 1104, a power supply component 1106, a multimedia component 1108, an audio component 1110, an input/output (I/O) interface 1112, a sensor component 1114 and communication component 1116.

The processing component 1102 generally controls the overall operations of the terminal 1100, such as operations associated with display, phone calls, data communications, camera operations, and recording operations. The processing component 1102 may include one or more processors 1120 to execute instructions to complete all or part of the steps of the above method. Additionally, processing component 1102 may include one or more modules that facilitate interaction between processing component 1102 and other components. For example, processing component 1102 may include a multimedia module to facilitate interaction between multimedia component 1108 and processing component 1102.

The memory 1104 is configured to store various types of data to support operations at the terminal 1100. Examples of such data include instructions, contact data, phonebook data, messages, pictures, videos, and the like for any application or method operating on the terminal 1100. Memory 1104 may be implemented by any type of volatile or nonvolatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

Power supply component 1106 provides power to various components of terminal 1100. Power components 1106 may include a power management system, one or more power supplies, and other components associated with generating, managing, and distributing power to terminal 1100.

The multimedia component 1108 includes a screen that provides an output interface between the terminal 1100 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 1108 includes a front-facing camera and/or a rear-facing camera. When the terminal 1100 is in an operation mode, such as a shooting mode or a video mode, the front camera and/or the rear camera may receive external multimedia data. Each of the front and rear cameras may be a fixed optical lens system or have focal length and optical zoom capability.

The audio component 1110 is configured to output and/or input audio signals. For example, the audio component 1110 includes a microphone (MIC), which is configured to receive an external audio signal when the terminal 1100 is in an operation mode, such as a call mode, a recording mode and a voice recognition mode. Received audio signals may be further stored in memory 1104 or sent via communication component 1116. In some embodiments, the audio component 1110 also includes a speaker for outputting audio signals.

The I/O interface 1112 provides an interface between the processing component 1102 and a peripheral interface module, which may be a keyboard, a click wheel, a button, and the like. These buttons may include, but are not limited to: a home button, volume buttons, start button, and lock button.

The sensor assembly 1114 includes one or more sensors for providing various aspects of the status assessment for the terminal 1100. For example, the sensor component 1114 can detect the open/closed state of the terminal 1100, the relative positioning of components, such as the display and the keypad of the terminal 1100. The sensor component 1114 can also detect the position change of the terminal 1100 or a component of the terminal 1100, the presence or absence of user contact with the terminal 1100, the orientation or acceleration/deceleration of the terminal 1100, and the temperature change of the terminal 1100. The sensor component 1114 may include a proximity sensor configured to detect the presence of nearby objects in the absence of any physical contact. The sensor component 1114 may also include a light sensor, such as a CMOS or CCD image sensor, for use in imaging applications. In some embodiments, the sensor component 1114 may also include an acceleration sensor, a gyroscope sensor, a magnetic sensor, a pressure sensor, or a temperature sensor.

The communication component 1116 is configured to facilitate wired or wireless communications between terminal 1100 and other devices. The terminal 1100 may access a wireless network based on a communication standard, such as WiFi, 2G, 3G, 4G LTE, 5G NR, or a combination thereof. In some embodiments, the communication component 1116 receives broadcast signals or broadcast related information from an external broadcast management system via a broadcast channel. In some embodiments, the communication component 1116 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, terminal 1100 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component implementation, which is configured to perform the above method.

In some embodiments, there is also provided a non-transitory computer-readable storage medium including instructions, such as a memory 1104 including instructions, which are executable by the processor 1120 of the terminal 1100 to implement the above method. For example, the non-transitory computer-readable storage medium may be ROM, random access memory (RAM), CD-ROM, magnetic tape, floppy disk, optical data storage device, and the like.

In view of above, embodiments of this disclosure provide a sending time determination method, a sending time determination device, an indoor goniometric method, an indoor goniometric device, a terminal, and a computer-readable storage medium.

According to a first aspect of this disclosure, a sending time determination method is proposed, which is applied to a device to be measured and included: determining a transmission duration and a synchronization error of signal transmission between the device to be measured and a goniometric device; determining a receiving time slot for the goniometric device to receive ultrasonic goniometric signal sent by the device to be measured, where the goniometric device is configured to receive ultrasonic goniometric signals sent by a plurality of devices to be measured, and the goniometer device receives the ultrasonic goniometric signals sent by different devices to be measured in different receiving time slots; and determining a sending time of the ultrasonic goniometric signal according to the receiving time slot, the transmission duration and the synchronization error.

According to a second aspect of this disclosure, an indoor goniometric method is proposed, which is applied to a goniometric device and includes: exchanging synchronization signal with a device to be measured, causing the device to be measured to determine a transmission duration and a synchronization error of signal transmission between the device to be measured and the goniometric device; indicating to the device to be measured a receiving time slot of ultrasonic goniometric signal, where the transmission duration, the synchronization error and the receiving time slot are used for the device to be measured to determine a sending time of the ultrasonic goniometric signal, and receiving time slots indicated for different devices to be measured are different; and receiving the ultrasonic goniometric signal sent by the device to be measured in the receiving time slot, thereby performing indoor goniometric measurement for the device to be measured.

According to a third aspect of this disclosure, a sending time determination device is proposed, which is applied to a device to be measured and includes: a parameter determining module, configured to determine a transmission duration and a synchronization error of signal transmission between the device to be measured and a goniometric device; a time slot determining module, configured to determine a receiving time slot for the goniometric device to receive ultrasonic goniometric signal sent by the device to be measured, where the goniometric device is configured to receive ultrasonic goniometric signals sent by a plurality of devices to be measured, and the goniometer device receives the ultrasonic goniometric signals sent by different devices to be measured in different receiving time slots; and a sending time determining module, configured to determine a sending time of the ultrasonic goniometric signal according to the receiving time slot, the transmission duration and the synchronization error.

According to a fourth aspect of this disclosure, an indoor goniometric device is proposed, which is applied to a goniometric device and includes: a signal exchanging module, configured to exchange synchronization signal with a device to be measured, causing the device to be measured to determine a transmission duration and a synchronization error of signal transmission between the device to be measured and the goniometric device; an indicating module, configured to indicate to the device to be measured a receiving time slot of ultrasonic goniometric signal, where the transmission duration, the synchronization error and the receiving time slot are used for the device to be measured to determine a sending time of the ultrasonic goniometric signal, and receiving time slots indicated for different devices to be measured are different; and a receiving module, configured to receive the ultrasonic goniometric signal sent by the device to be measured in the receiving time slot, thereby performing indoor goniometric measurement for the device to be measured.

According to a fifth aspect of this disclosure, an electronic device is provided and includes: a processor; and a memory for storing executable instructions of the processor; where the processor is configured to implement the method according to the first aspect as described above by running the executable instructions.

According to a sixth aspect of the embodiments of this disclosure, there is provided a computer-readable storage medium storing thereon computer instructions which, when being executed by a processor, are used for implementing the steps of the method according to the first aspect as described above.

According to a seventh aspect of this disclosure, an electronic device is provided and includes: a processor; and a memory for storing executable instructions of the processor; where the processor is configured to implement the method according to the second aspect as described above by running the executable instructions.

According to an eighth aspect of the embodiments of this disclosure, there is provided a computer-readable storage medium storing thereon computer instructions which, when being executed by a processor, are used for implementing the steps of the method according to the second aspect as described above.

It can be seen from the above technical solutions provided by this disclosure that the device to be measured is able to determine the transmission duration and synchronization error of signal transmission with the goniometric device, for example, by performing signal interaction with the goniometric device. The receiving time slot for the goniometric device to receive the ultrasonic goniometric signal can be further determined, for example, through indication of the goniometric device.

Furthermore, when the transmission duration and synchronization error are determined, based on the receiving time slot required by the goniometric device, the sending time of the ultrasonic goniometer signal can be accurately determined, so that the ultrasonic goniometer signal can be received by the goniometric device in the receiving time slot required by the goniometric device.

The above descriptions are only preferred embodiments of this disclosure, and are not intended to limit this disclosure. Any modifications, equivalent replacements, improvements, and the like made within the spirit and principles of this disclosure shall fall within the protection scope of this disclosure.

What is claimed is:

1. A sending time determination method, comprising:
   determining, by a first device to be measured, a transmission duration and a synchronization error of signal transmission between the first device and a goniometric device;
   determining, by the first device, a receiving time slot for the goniometric device to receive ultrasonic goniometric signal sent by the first device, wherein the goniometric device is configured to receive ultrasonic goniometric signals sent by a plurality of devices to be measured, and the goniometer device receives the ultrasonic goniometric signals sent by different devices to be measured in different receiving time slots; and
   determining, by the first device, a sending time of the ultrasonic goniometric signal according to the receiving time slot, the transmission duration and the synchronization error,
   wherein determining the transmission duration of the signal transmission between the first device and the goniometric device comprises:
   determining a first receiving time for receiving a first synchronization signal sent by the goniometric device;
   determining a second sending time for sending a second synchronization signal;
   determining a first sending time in response to the goniometric device sending the first synchronization signal and determining a second receiving time in response to the goniometric device receiving the second synchronization signal; and
   determining the transmission duration according to the first sending time, the first receiving time, the second sending time and the second receiving time.

2. The method as claimed in claim 1, wherein determining the synchronization error between the goniometric device and the first device comprises:
   determining the synchronization error according to the second sending time, the second receiving time and the transmission duration.

3. The method as claimed in claim 1, wherein the first synchronization signal comprises at least one of:
   first frequency sweep signal;
   packet quantity; or
   at least one data block;
   wherein the first frequency sweep signal is configured for the first device to determine the first receiving time, the packet quantity is configured for indicating a number of data blocks carried in the first synchronization signal, and the data block is configured for carrying first delay information of the first device and identification information of the first device.

4. The method as claimed in claim 3, wherein determining the second sending time for sending the second synchronization signal comprises:
   determining the first delay information corresponding to the first device by parsing the first synchronization signal; and
   determining the second sending time according to the first receiving time and the first delay information.

5. The method as claimed in claim 3, wherein the second synchronization signal comprises second frequency sweep signal, the second frequency sweep signal is configured for the goniometric device to determine the second receiving time, and the second frequency sweep signal is different from the first frequency sweep signal.

6. The method as claimed in claim 1, wherein determining the first sending time in response to the goniometric device sending the first synchronization signal and determining the second receiving time in response to the goniometric device receiving the second synchronization signal comprises:
   receiving third synchronization signal sent by the goniometric device, wherein the third synchronization signal carries the first sending time and the second receiving time.

7. An indoor goniometric method, comprising:
   exchanging, by a goniometric device, synchronization signal with a first device to be measured, causing the first device to determine a transmission duration and a synchronization error of signal transmission between the first device and the goniometric device;
   indicating, by the goniometric device, to the first device a receiving time slot of ultrasonic goniometric signal, wherein the transmission duration, the synchronization error and the receiving time slot are configured for the first device to determine a sending time of the ultrasonic goniometric signal, and receiving time slots indicated for different devices to be measured are different; and
   receiving, by the goniometric device, the ultrasonic goniometric signal sent by the first device in the receiving time slot, and performing indoor goniometric measurement for the first device,
   wherein exchanging the synchronization signal with the first device, causing the first device to determine the transmission duration and the synchronization error of the signal transmission between the first device and the goniometric device comprises:
   sending first synchronization signal to the first device; and
   receiving second synchronization signal sent by the first device;
   wherein first sending time and first receiving time of the first synchronization signal, and second sending time and second receiving time of the second synchronization signal are configured for the first device to determine the transmission duration and the synchronization error of the signal transmission between the first device and the goniometric device.

8. The method as claimed in claim 7, wherein the first synchronization signal comprises at least one of:

first frequency sweep signal;
packet quantity; or
at least one data block;
wherein the first frequency sweep signal is configured for the first device to determine the first receiving time, the packet quantity is configured for indicating a number of data blocks carried in the first synchronization signal, and the data block is configured for carrying first delay information of the first device and identification information of the first device.

9. The method as claimed in claim 7, wherein the second synchronization signal comprises second frequency sweep signal, the second frequency sweep signal is configured for the goniometric device to determine the second receiving time, and the second frequency sweep signal is different from the first frequency sweep signal.

10. A terminal, comprising:
a processor; and
a memory for storing executable instructions of the processor;
wherein the processor, through running the executable instructions, is configured to:
determine a transmission duration and a synchronization error of signal transmission between the terminal to be measured and a goniometric device;
determine a receiving time slot for the goniometric device to receive ultrasonic goniometric signal sent by the terminal, wherein the goniometric device is configured to receive ultrasonic goniometric signals sent by a plurality of terminals to be measured, and the goniometer device receives the ultrasonic goniometric signals sent by different terminals to be measured in different receiving time slots; and
determine a sending time of the ultrasonic goniometric signal according to the receiving time slot, the transmission duration and the synchronization error,
wherein the processor is further configured to:
determine a first receiving time for receiving first synchronization signal sent by the goniometric device;
determine a second sending time for sending second synchronization signal;
determine a first sending time in response to the goniometric device sending the first synchronization signal and determine a second receiving time in response to the goniometric device receiving the second synchronization signal; and
determine the transmission duration according to the first sending time, the first receiving time, the second sending time and the second receiving time.

11. The terminal as claimed in claim 10, wherein the processor is further configured to:
determine the synchronization error according to the second sending time, the second receiving time and the transmission duration.

12. The terminal as claimed in claim 10, wherein the first synchronization signal comprises at least one of:
first frequency sweep signal;
packet quantity; or
at least one data block;
wherein the first frequency sweep signal is configured for the terminal to determine the first receiving time, the packet quantity is configured for indicating a number of data blocks carried in the first synchronization signal, and the data block is configured for carrying first delay information of the terminal and identification information of the terminal.

13. The terminal as claimed in claim 12, wherein the processor is further configured to:
determine the first delay information corresponding to the terminal by parsing the first synchronization signal; and
determine the second sending time according to the first receiving time and the first delay information.

14. The terminal as claimed in claim 12, wherein the second synchronization signal comprises second frequency sweep signal, the second frequency sweep signal is configured for the goniometric device to determine the second receiving time, and the second frequency sweep signal is different from the first frequency sweep signal.

15. A terminal, comprising:
a processor; and
a memory for storing executable instructions of the processor;
wherein the processor, through running the executable instructions, is configured to implement the indoor goniometric method as claimed in claim 7.

16. A non-transitory computer-readable storage medium, storing thereon computer instructions which, when being executed by a processor, are used for implementing steps of the sending time determination method as claimed in claim 1.

17. A non-transitory computer-readable storage medium, storing thereon computer instructions which, when being executed by a processor, are used for implementing steps of the indoor goniometric method as claimed in claim 7.

* * * * *